United States Patent
Fujita et al.

(10) Patent No.: US 7,095,192 B1
(45) Date of Patent: Aug. 22, 2006

(54) ROTATING ELECTRIC MACHINE FOR AUTOMOTIVE APPLICATION

(75) Inventors: Masahiko Fujita, Tokyo (JP); Haruyuki Kometani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/305,162

(22) Filed: Dec. 19, 2005

(51) Int. Cl.
*H02P 5/00* (2006.01)

(52) U.S. Cl. .................. 318/139; 318/727; 318/729; 318/767; 310/179; 310/180; 322/44; 322/46; 322/47

(58) Field of Classification Search ............... 318/139, 318/727, 729; 310/179; 322/44, 46
See application file for complete search history.

(56) References Cited

U.S. PATENT DOCUMENTS

| | | | | |
|---|---|---|---|---|
| 5,306,977 A | * | 4/1994 | Hayashi | 310/263 |
| 5,483,116 A | * | 1/1996 | Kusase et al. | 310/263 |
| 5,969,459 A | * | 10/1999 | Taniguchi et al. | 310/263 |

\* cited by examiner

*Primary Examiner*—Rina Duda
(74) *Attorney, Agent, or Firm*—Sughrue Mion, PLLC

(57) ABSTRACT

An automotive generator/motor is driven by a battery via an inverter. Resistance 2Ra0 is expressed by $2Ra0 = Vmax/\sqrt{3} Iamax$, where Vmax is a maximum voltage applicable across any two terminals from the inverter and Iamax is a maximum current which must be fed from the inverter into each of the terminals when the maximum voltage Vmax is applied for maximizing torque produced by the automotive generator/motor at a power factor of 1 under voltage saturation conditions, and the armature winding is configured such that resistance 2Ra across any two terminals satisfies a relationship expressed by $0.8Ra0 \leqq 2Ra \leqq 3.8Ra0$.

8 Claims, 3 Drawing Sheets

ROTATING ELECTRIC MACHINE FOR AUTOMOTIVE APPLICATION

BACKGROUND OF THE INVENTION

1. Field of the Invention

The present invention relates to a rotating electric machine for use onboard a motor vehicle.

2. Description of the Background Art

Batteries equipped onboard a motor vehicle typically supply a terminal voltage of 14 V or less. During power running of the vehicle performed with the assistance of an automotive rotating electric machine (i.e., an automotive motor), such as at engine restart from idle stop or during engine-assist operation of the vehicle, this type of battery is not able to provide a sufficient output torque due to low output voltage. Particularly at engine restart from idle stop, in which the engine once shut off at a vehicle stop is restarted by running the vehicle by only the onboard motor which works as a starter motor, the motor should preferably produce a greater starting torque. A greater motor torque is also needed for performing the engine-assist operation to give extra power in high-speed ranges. Generally, it is necessary for a low-voltage driving system to flow a larger electric current for producing greater output power. However, the amount of electric current that can be flowed through the driving system is more or less limited due to heat generation and reliability of components used in an inverter.

Additionally, in an electric driving system, a voltage drop equivalent to the product of electric current and resistance causes an energy loss in the form of Joule heat, and a torque-generating voltage expressed by the product of effective magnetic flux and motor speed decreases by an amount corresponding to this voltage drop. This means that if the terminal-to-terminal resistance of each armature coil of the automotive motor increases, the effective magnetic flux decreases by a corresponding amount, making it necessary to perform field-weakening control. A low-voltage driving system is already in a voltage saturation range (field-weakening range) from a certain point in a low-speed range and, thus, a sufficient torque is not obtained in a high-speed range in which the motor speed is relatively high (typically 300 rpm or above). Here, the voltage saturation range is a range in which the motor is controlled by field-weakening control operation by flowing a negative d-axis current Id as a voltage induced by a combination of field flux and armature flux exceeds a terminal voltage in this range. Although it is possible to increase the starting torque produced by the motor by increasing the number of turns of armature coils, electric resistance of each armature coil increases with an increase in the number of turns thereof, resulting in a reduction in the torque obtained in the high-speed range (hereinafter referred to as the high-speed torque). Conversely, if the resistance of each armature coil is reduced by decreasing the number of turns thereof, a desired level of starting torque would not be obtained.

As the conventional automotive motor is thus configured, it is difficult to obtain both a starting torque characteristic required at engine restart and a high-speed torque characteristic required in the voltage saturation range.

SUMMARY OF THE INVENTION

In light of the aforementioned problem of the prior art, it is an object of the invention to provide an automotive rotating electric machine which can thus structured can provide a starting torque characteristic required at engine restart and a high-speed torque characteristic required in a voltage saturation range.

According to the invention, an automotive rotating electric machine which is driven by a battery via an inverter includes an armature including a ring-shaped armature core with slots formed in a curved inner surface thereof, and an armature winding which includes coils fitted in the armature core and terminals by which the coils are connected to the inverter, and a field-generating unit rotatably mounted inside the armature, the field-generating unit including magnetic poles, and a field winding or a combination of a field winding and permanent magnets for producing magnetic fluxes from the magnetic poles. In this automotive rotating electric machine, resistance $2Ra0$ measured across any two of the terminals under voltage saturation conditions is expressed by $2Ra0 = Vmax/\sqrt{3}\,Iamax$, where Vmax is a maximum voltage applicable across any two of the terminals from the inverter and Iamax is a maximum current which must be fed from the inverter into each of the terminals when the maximum voltage Vmax is applied for maximizing torque produced by the automotive rotating electric machine at a power factor of 1 under voltage saturation conditions, and the armature winding is configured such that resistance $2Ra$ across any two of the terminals satisfies a relationship expressed by $0.8Ra0 \leq 2Ra \leq 3.8Ra0$.

The automotive rotating electric machine thus structured can provide a starting torque characteristic required at engine restart and a high-speed torque characteristic required under voltage saturation conditions.

These and other objects, features and advantages of the invention will become more apparent upon reading the following detailed description along with the accompanying drawings.

DESCRIPTION OF THE PREFERRED EMBODIMENT

A preferred embodiment of the present invention is now described in detail with reference to the appended drawings.

Figure 1:
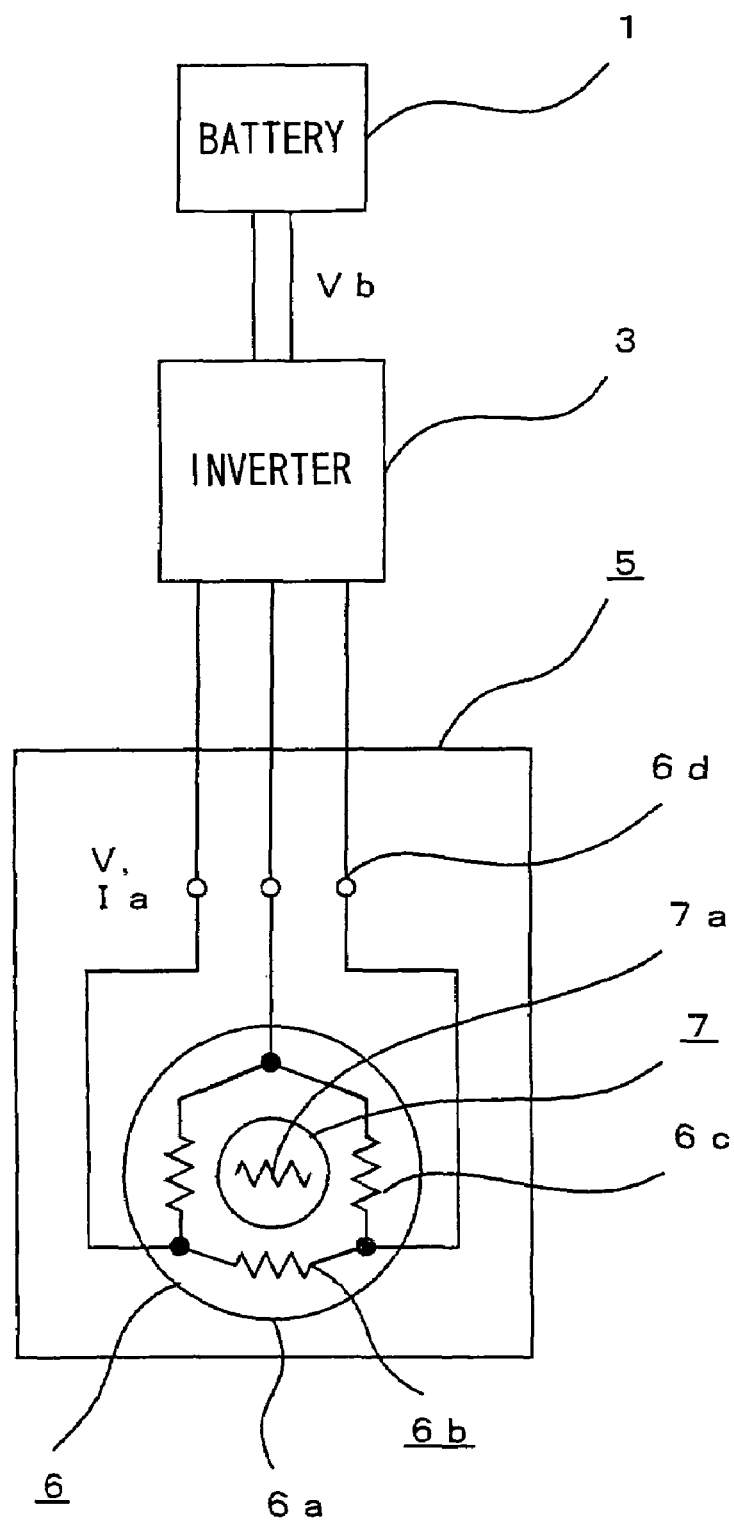
FIG. 1 is a configuration diagram of a generator/motor and a driving circuit thereof installed on a motor vehicle according to a preferred embodiment of the invention.
Figure 2:
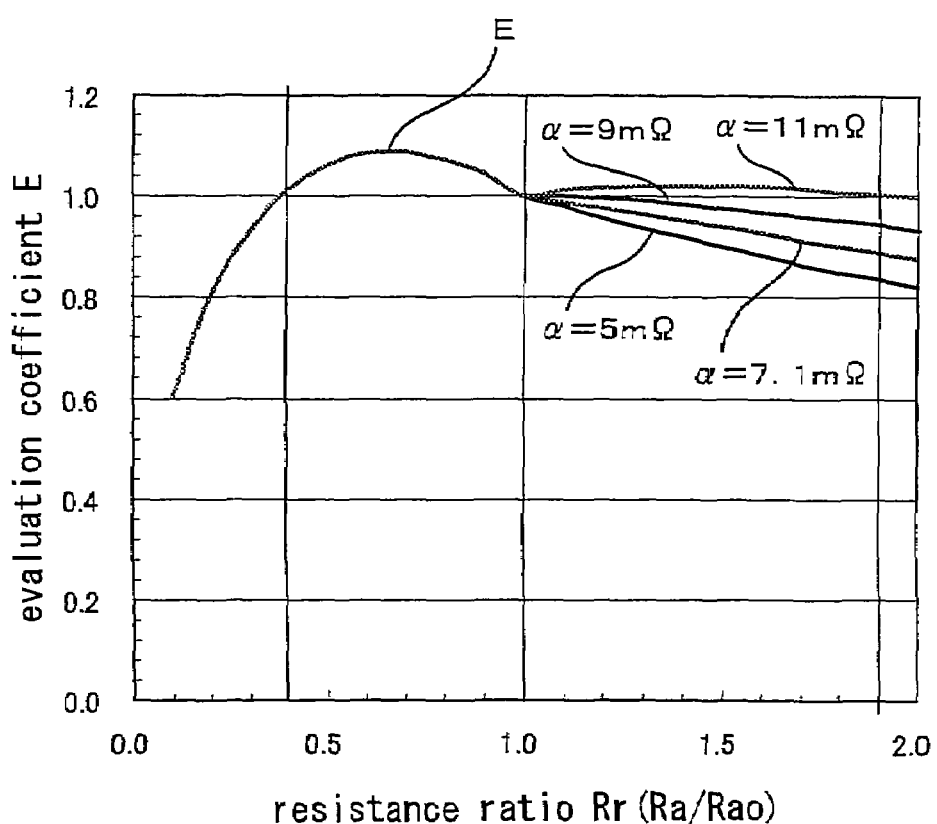
FIG. 2 is a diagram showing how a torque characteristic evaluation coefficient of the generator/motor varies.

FIG. 1 is a configuration diagram of a generator/motor 5 and a driving circuit thereof installed on a motor vehicle according to the preferred embodiment of the invention, and FIG. 2 is a diagram showing how a later-described evaluation coefficient E of a torque characteristic of the generator/motor 5 varies. As shown in FIG. 1, an inverter 3 connected to a battery 1 converts direct current (DC) power fed from the battery 1 into variable frequency, variable voltage 3-phase alternating current (AC) power and supplies the 3-phase AC power to the generator/motor 5.

The generator/motor 5 includes an armature (stator) 6 and a field-generating unit (rotor) 7. The armature 6 includes a ring-shaped armature core 6a with slots formed in a curved inner surface thereof and an armature winding 6b which includes delta-connected coils 6c fitted in the slots in the armature core 6a and terminals 6d by which the coils 6c are connected to the inverter 3. The field-generating unit 7 includes magnetic poles (not shown), a field winding 7a for generating magnetic fluxes from the magnetic poles and permanent magnets (not shown). The field winding 7a and the permanent magnets together produce a total field flux Φ required. The field-generating unit 7 is rotatably mounted inside the armature 6 and linked to an engine (not shown) of the vehicle to provide auxiliary driving power during engine starting or engine-assist operation.

If battery voltage is Vb, root-mean-square (rms) voltage V applied across any two of the terminals 6d of the generator/motor 5 is given by equation (1) below:

$$V=(\beta/\sqrt{2})(Vb-\alpha \cdot I) \quad (1)$$

where I is armature current expressed by using d-axis current Id and q-axis current Iq as $I=\sqrt{Id^2+Iq^2}$ which is calculated as $I=\sqrt{3}$ Ia by using current Ia flowing through each of the terminals 6d. Also, α is an equivalent resistance of entire circuitry from the battery 1 to the terminals 6d of the generator/motor 5 calculated from all resistances distributed throughout the circuitry including the internal resistance of the battery 1, wiring resistances and resistance of a metal-oxide-semiconductor field-effect transistor (MOSFET) used as a current switching device in the inverter 3, β is a value representative of a voltage drop which occurs in the inverter 3 when the inverter 3 converts the input battery voltage Vb into a specified voltage applied to the armature 6, and $\sqrt{2}$ is a coefficient multiplied for converting the voltage into an rms value.

Generally, a rotating electric machine is run at a power factor of 1 as much as possible because the rotating electric machine can be efficiently operated with a reduced level of reactive power if the power factor is set to 1 by regulating field current and armature current. The generator/motor 5 of the present embodiment offers an advantage that the same can be run at power factor 1 with each as the generator/motor 5 has the field winding 7a.

Torque T the generator/motor 5 produces when operated at the power factor of 1 in a controlled fashion is expressed as a function of the total field flux Φ as follows:

$$T=\Phi \cdot I \quad (2)$$

The total field flux Φ under voltage saturation conditions is given by the following equation:

$$\Phi=(V-Ra \cdot I)/\omega \quad (3)$$

where 2Ra is the resistance across any two of the terminals 6d of the generator/motor 5 and ω is angular frequency expressed in radians per second.

Substituting equation (3), equation (2) is rewritten as follows:

$$T=(1/\omega)(-Ra(I-V/2Ra)^2+V^2/4Ra) \quad (4)$$

From equation (4) above, it is recognized that, when $$I=V/2Ra \quad (5)$$

high-speed torque T which is the torque produced under voltage saturation conditions is maximized as expressed by equation (6) below:

$$T=V^2/4\omega \cdot Ra \quad (6)$$

From the relationship between equation (1) and equation (5), a current I0 which produces a maximum torque at the power factor of 1 under voltage saturation conditions is expressed by equation (7) below:

$$I0=\beta \cdot Vb/(2(\sqrt{2})Ra+\alpha \cdot \beta) \quad (7)$$

Since the current is limited by semiconductor devices in an actual apparatus, it may be impossible to feed exactly the current as calculated by equation (7) above. Expressing the value of current limitation as Imax, a current Iopt which produces the maximum torque is given as follows:

$$Iopt=Imax (\text{when } I0 \geq Imax) \quad (8a)$$

$$Iopt=I0 (\text{when } I0 < Imax) \quad (8b)$$

Here, resistance 2Ra0 across any two terminals 6d of the generator/motor 5 is 2Ra0=Vmax/$\sqrt{3}$ Iamax as expressed by a maximum voltage Vmax of the voltage V applicable across any two terminals 6d of the generator/motor 5 and a maximum current Iamax fed into each of the terminals 6d. The terminal-to-terminal resistance 2Ra at which I0=Imax is equal to 2Ra0, which is calculated by substituting Imax for I0 of equation (7) and obtaining Ra therefrom, as expressed by equation (9) below. When the armature current is Imax, the current flowing through each of the terminals 6d is Iamax, or Imax=$\sqrt{3}$ Iamax.

$$2Ra=2Ra0=\beta(Vb-\alpha \cdot Imax) \quad (9)$$

Here, resistance ratio Rr is defined as the ratio of the resistance 2Ra across any two of the terminals 6d of the generator/motor 5 to the resistance 2Ra0 (i.e., Rr=Ra/Ra0) when the maximum voltage Vmax is applied across any two terminals 6d. The voltage V (=V0) applied across any two terminals 6d under voltage saturation conditions when the power factor is 1 is expressed by equation (10) below:

$$V0=(\beta/\sqrt{2})(Vb-\alpha \cdot Imax) \quad (10)$$

The high-speed torque T (=T0) produced in this situation is expressed by equation (11) below:

$$T0=V0^2/4\omega \cdot Ra0 \quad (11)$$

When the resistance ratio Rr is larger than 1 (Rr>1), the armature current which flows at the power factor of 1 under voltage saturation conditions is given by equation (7) above and the terminal-to-terminal voltage V (=Vhigh) applied in this situation is expressed by equation (12) below:

$$Vhigh=(\beta/\sqrt{2})(Vb-\alpha \cdot I0) \quad (12)$$

Also, the high-speed torque T (=Thigh) in this situation is expressed by equation (13) below:

$$Thigh=Vhigh^2/4\omega \cdot Ra \quad (13)$$

When the resistance ratio Rr is smaller than 1 (Rr<1), the armature current which flows under voltage saturation conditions is restricted by the current limitation value Imax and the terminal-to-terminal voltage V (=Vlow) applied in this situation becomes equal to V0 given by equation (10). Thus, $$Vlow=V0=(\beta/\sqrt{2})(Vb-\alpha \cdot Imax) \quad (14)$$

Also, the high-speed torque T (=Tlow) in this situation is expressed by equation (15) below:

$$Tlow=Imax(V0-Ra \cdot Imax)/\omega \quad (15)$$

The foregoing discussion deals with a voltage saturation range, or a range in which field-weakening control operation is performed by flowing a negative d-axis current Id as a voltage induced by a combination of field flux and armature flux exceeds a terminal voltage in this range. This field-weakening range is a relatively high-speed range (typically 300 rpm or above) in which the generator/motor 5 exhibits a high-speed torque characteristic. From equations (11), (13) and (15) above, it is recognized that the high-speed torque T is simply dependent on the value of resistance Ra and the current limitation value Imax, and not on the number of turns of the armature winding 6b.

It is also recognized that, if the values of α and β are known, a high-speed torque ratio Tr, which is the ratio of the high-speed torque T (expressed by equation (11), (13) or (15)) to the torque T (=T0 as expressed by equation (11)) when Rr=1, is calculated as follows:

$$Tr=T/T0 \quad (16)$$

For the generator/motor 5 used as an automotive motor, it is necessary to have such a torque characteristic that the generator/motor 5 produces an increased torque (high-speed torque T) when the rotor (field-generating unit 7) is rotating as well as a starting torque Ts when the rotor is not rotating. Since the generator/motor 5 is not under voltage saturation conditions at start-up, it is obvious that the starting torque is maximized when a maximum armature current is flowed. The starting torque Ts is proportional to the maximum armature current, the number of turns of the stator (i.e., the number of turns n of the coils 6c of the armature winding 6b) and the field flux and does not vary with changes in the terminal-to-terminal resistance 2Ra. In short, the starting torque Ts is supposed to be simply proportional to the number of turns n of the coils 6c of the armature winding 6b as expressed below:

$$Ts \propto n \quad (17)$$

When the number of turns of the coils 6c increases, the coils 6c proportionally lengthen. If the cross-sectional area of the slots formed in the armature core 6a is to be kept unchanged even when the number of turns of the coils 6c is increased, the cross-sectional area S of each coil 6c must be reduced in inverse proportion to the number of turns of the coils 6c. Thus, assuming that copper wires are used as the coils 6c, resistance R of the armature winding 6b is expressed by equation (18) below by using the cross-sectional area S and length L of the coils 6c and resistivity ρ of copper:

$$R=\rho \cdot L/S = \rho \cdot n \cdot L0/(S0/n) = n^2 \cdot \rho \cdot L0/S0 \quad (18)$$

where L0 is the length of one turn of each coil 6c and S0 is a value obtained by multiplying a specific space factor of the coils 6c, that is, the ratio of the total cross-sectional area of the coils 6c to the total cross-sectional area of the slots in the armature core 6a, in which it is assumed for the sake of simplicity that the space factor does not change even when the number of turns of the coils 6c is changed.

It is recognized from above that the terminal-to-terminal resistance 2Ra of the generator/motor 5 is proportional to the square of the number of turns n of the coils 6c. Thus, the starting torque Ts is expressed as follows:

$$Ts \propto \sqrt{Ra} \quad (19)$$

Here, starting torque ratio Tsr is defined as the ratio of starting torque Ts0 when the terminal-to-terminal resistance 2Ra is 2Ra0 (i.e., Tsr=Ts/Ts0). To obtain an automotive motor which offers a starting torque characteristic required at engine restart and a high-speed torque characteristic required in a voltage saturation range at the power factor of 1, it is desirable that the evaluation coefficient E which is given as the product of the starting torque ratio Tsr and the aforementioned high-speed torque ratio Tr is larger than 1.

$$E=Tsr \cdot Tr=(Ts/Ts0) \cdot (T/T0) \quad (20)$$

FIG. 2 shows how the evaluation coefficient E of the torque characteristic of the generator/motor 5 varies when parameters Vb=12 V, α and β are varied within practical ranges. Since the evaluation coefficient E does not vary with the value of β, however, only the value of α was varied within a range of 5 mΩ to 11 mΩ. It is seen from FIG. 2 that when the resistance ratio Rr is within a range of 0.4≦Rr≦1.9, or when the terminal-to-terminal resistance 2Ra is within a range of $$0.8Ra0 \leq 2Ra \leq 3.8Ra0 \quad (21)$$

the generator/motor 5 exhibits both a satisfactory starting torque characteristic and a satisfactory high-speed torque characteristic.

It is also seen from FIG. 2 that, regardless of the value of α, the generator/motor 5 exhibits satisfactory starting and high-speed torque characteristics with the evaluation coefficient E exceeding 1 when the resistance ratio Rr is within a range of 0.4≦Rr<1, or when the terminal-to-terminal resistance 2Ra is within a range of $$0.8Ra0 \leq 2Ra < 2Ra0 \quad (22)$$

Figure 3:
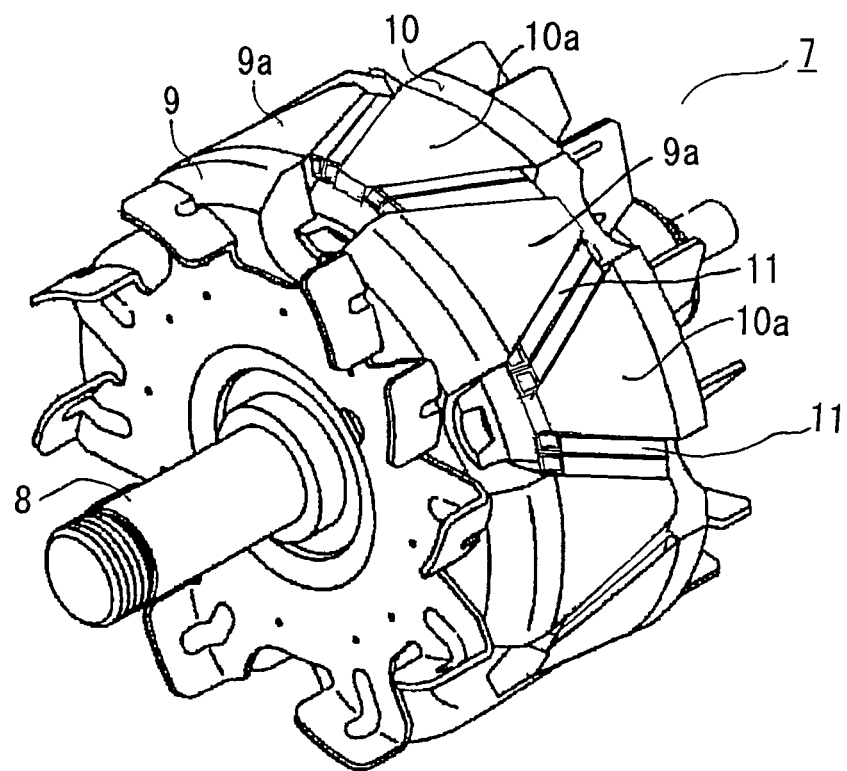
FIG. 3 is a perspective view of a claw-pole type field-generating unit (rotor).

FIG. 3 is a perspective view of the field-generating unit (rotor) 7 which is configured as a claw-pole type. As shown in FIG. 3, the field-generating unit (rotor) 7 includes a shaft 8, a field winding 7a (not shown) arranged around the shaft 8, and a pair of pole cores 9, 10 on which a plurality of claw-shaped poles 9a, 10a are formed.

In the automotive motor having the field winding 7a and the claw-pole type field-generating unit 7, in which a current flowed through the field winding 7a can be adjusted, the field winding 7a can be wound in a concentrated fashion around the shaft 8 regardless of the number of poles to enable easy control at the power factor of 1 so that the field winding 7a can be easily fitted in the field-generating unit 7. In the claw-pole type automotive motor, significant magnetic saturation tends to occur due to field flux produced by a field current. Should such magnetic saturation occurs, a range in which the field current can be adjusted is limited. In the field-generating unit 7 of FIG. 3, however, permanent magnets 11 are fitted along sides of the individual claw-shaped poles 9a, 10a as illustrated, and therefore, if the permanent magnets 11 are magnetized such that the polarity of each permanent magnet 11 is oriented in a direction opposite to the direction of the polarity of a magnetic field produced by the field flux, the degree of magnetic saturation caused by the field flux lessens and the adjustable range of the field current broadens.

While the foregoing discussion of the preferred embodiment has revealed a configuration in which the generator/motor 5 works as a motor, the invention can also be applied to an automotive motor used as a starter motor or an engine assist motor with the same advantageous effects as thus far described.

The invention is now described in further detail with reference to specific examples of implementation thereof.

EXAMPLE 1

If the battery voltage Vb=12 V, the equivalent resistance α=7.1 mΩ, β=0.91 and the maximum current Iamax=200 A (armature current I=√3·200), the terminal-to-terminal resistance of the generator/motor 5 is 2Ra0=17.72 mΩ. In this case, the high-speed torque T0 is calculated as T0=1063.4/ω).

When the terminal-to-terminal resistance 2Ra of the generator/motor 5 is set to 2Ra=0.8×2Ra0=14.176 mΩ so that the resistance ratio Rr (=2Ra/2Ra0) becomes equal to 0.8, the high-speed torque T is calculated as T=1276.1/ω. Thus, the high-speed torque ratio Tr is calculated as Tr=T/T0=1.2.

Since the terminal-to-terminal resistance 2Ra of the generator/motor 5 is 0.8 times the terminal-to-terminal resistance 2Ra0, the number of turns n of the armature winding 6*b* becomes $\sqrt{0.8}=0.8944$ times as large when the terminal-to-terminal resistance 2Ra is set as mentioned above. Since the starting torque Ts also becomes 0.8944 times as large, the starting torque ratio Tsr (=Ts/Ts0) becomes equal to 0.8944 in this case.

From the aforementioned equation (20), the torque characteristic evaluation coefficient E calculated as the product of the starting torque ratio Tsr and the high-speed torque ratio Tr is Tr·Tsr=1.2×0.8944=1.073. This means that the evaluation coefficient E becomes 1.073 times the evaluation coefficient E (=1) achieved when the terminal-to-terminal resistance 2Ra is equal to 2Ra0, or when the resistance ratio Rr is equal to 1, so that this Example produces an improved torque characteristic.

EXAMPLE 2

If the battery voltage Vb=12 V, the equivalent resistance α=11.0 mΩ, β=0.91 and the maximum current Iamax=200 A, the terminal-to-terminal resistance of the generator/motor 5 is 2Ra0=15.21 mΩ. In this case, the high-speed torque T0 is calculated as T0=912.87/ω.

When the terminal-to-terminal resistance 2Ra of the generator/motor 5 is set to 2Ra=1.2×2Ra0=18.255 mΩ so that the resistance ratio Rr (=2Ra/2Ra0) becomes equal to 1.2, the high-speed torque T is calculated as T=847.99/ω. Thus, the high-speed torque ratio Tr is calculated as Tr=T/T0=0.929.

Since the terminal-to-terminal resistance 2Ra of the generator/motor 5 is 1.2 times the terminal-to-terminal resistance 2Ra0, the number of turns n of the armature winding 6*b* becomes $\sqrt{1.2}=1.09545$ times as large when the terminal-to-terminal resistance 2Ra is set as mentioned above. Since the starting torque Ts also becomes 1.09545 times as large, the starting torque ratio Tsr (=Ts/Ts0) becomes equal to 1.09545 in this case.

From the aforementioned equation (20), the torque characteristic evaluation coefficient E calculated as the product of the starting torque ratio Tsr and the high-speed torque ratio Tr is Tr·Tsr=0.929×1.09545=1.0176. This means that the evaluation coefficient E becomes 1.0176 times the evaluation coefficient E (=1) achieved when the terminal-to-terminal resistance 2Ra is equal to 2Ra0, or when the resistance ratio Rr is equal to 1, so that this Example produces an improved torque characteristic.

In summary, an automotive rotating electric machine of the invention which is driven by a battery via an inverter includes an armature including a ring-shaped armature core with slots formed in a curved inner surface thereof, and an armature winding which includes coils fitted in the armature core and terminals by which the coils are connected to the inverter, and a field-generating unit rotatably mounted inside the armature, the field-generating unit including magnetic poles, and a field winding or a combination of a field winding and permanent magnets for producing magnetic fluxes from the magnetic poles. In this automotive rotating electric machine, resistance 2Ra0 measured across any two of the terminals under voltage saturation conditions is expressed by 2Ra0=Vmax/$\sqrt{3}$ Iamax, where Vmax is a maximum voltage applicable across any two of the terminals from the inverter and Iamax is a maximum current which must be fed from the inverter into each of the terminals when the maximum voltage Vmax is applied for maximizing torque produced by the automotive rotating electric machine at a power factor of 1 under voltage saturation conditions, and the armature winding is configured such that resistance 2Ra across any two of the terminals satisfies a relationship expressed by 0.8Ra0≦2Ra≦3.8Ra0.

The automotive rotating electric machine thus structured can provide a starting torque characteristic required at engine restart and a high-speed torque characteristic required under voltage saturation conditions.

In one feature of the invention, the resistance 2Ra across any two of the terminals satisfies a relationship expressed by 0.8Ra0≦2Ra<2Ra0.

The automotive rotating electric machine thus structured can provide both the starting torque characteristic required at engine restart and the high-speed torque characteristic required under voltage saturation conditions regardless of the value of resistance between the battery and the terminals of the armature winding.

In another feature of the invention, the field-generating unit employs a claw-pole type configuration.

Since the claw-pole type field-generating unit makes it possible to wind the field winding in a concentrated fashion around a shaft regardless of the number of poles so that the field winding can be easily wound.

In still another feature of the invention, the field-generating unit includes the field winding and the permanent magnets which are fitted along sides of the magnetic poles.

Thus, if the permanent magnets are magnetized such that the polarity of each permanent magnet is oriented in a direction opposite to the direction of the polarity of a magnetic field produced by field flux, the degree of magnetic saturation caused by the field flux lessens and the adjustable range of field current broadens.

What is claimed is:

1. An automotive rotating electric machine driven by a battery via an inverter, said automotive rotating electric machine comprising:
    an armature including:
        a ring-shaped armature core with slots formed in a curved inner surface thereof; and
        an armature winding which includes coils fitted in the armature core and terminals by which the coils are connected to said inverter; and
    a field-generating unit rotatably mounted inside the armature, the field-generating unit including:
        magnetic poles; and
        a field winding for producing magnetic fluxes from the magnetic poles;
    wherein resistance 2Ra0 is expressed by 2Ra0=Vmax/$\sqrt{3}$ Iamax, where Vmax is a maximum voltage applicable across any two of the terminals from said inverter and Iamax is a maximum current which must be fed from said inverter into each of the terminals when the maximum voltage Vmax is applied for maximizing torque produced by said automotive rotating electric machine at a power factor of 1 under voltage saturation conditions; and
    wherein the armature winding is configured such that resistance 2Ra across any two of the terminals satisfies a relationship expressed by 0.8Ra0≦2Ra≦3.8Ra0.

2. The automotive rotating electric machine according to claim 1 wherein the resistance 2Ra across any two of the terminals satisfies a relationship expressed by 0.8Ra0≦2Ra<2Ra0.

3. The automotive rotating electric machine according to claim 1 wherein the field-generating unit employs a claw-pole type configuration.

4. The automotive rotating electric machine according to claim 2 wherein the field-generating unit employs a claw-pole type configuration.

5. The automotive rotating electric machine according to claim 1 wherein the field-generating unit further includes permanent magnets in addition to the field winding for producing magnetic fluxes from the magnetic poles.

6. The automotive rotating electric machine according to claim 2 wherein the field-generating unit further includes permanent magnets in addition to the field winding for producing magnetic fluxes from the magnetic poles.

7. The automotive rotating electric machine according to claim 5 wherein the permanent magnets are fitted along sides of the magnetic poles.

8. The automotive rotating electric machine according to claim 6 wherein the permanent magnets are fitted along sides of the magnetic poles.

* * * * *